United States Patent
Rivera

(10) Patent No.: US 11,429,421 B2
(45) Date of Patent: Aug. 30, 2022

(54) SECURITY RISK LOAD BALANCING SYSTEMS AND METHODS

(71) Applicant: Citrix Systems, Inc., Fort Lauderdale, FL (US)

(72) Inventor: Juan Rivera, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 435 days.

(21) Appl. No.: 16/660,341

(22) Filed: Oct. 22, 2019

(65) Prior Publication Data

US 2021/0117218 A1     Apr. 22, 2021

(51) Int. Cl.
*G06F 9/455* (2018.01)
*G06F 9/451* (2018.01)
*H04L 9/40* (2022.01)

(52) U.S. Cl.
CPC .......... *G06F 9/45558* (2013.01); *G06F 9/452* (2018.02); *H04L 63/0272* (2013.01); *G06F 2009/4557* (2013.01); *G06F 2009/45595* (2013.01)

(58) Field of Classification Search
CPC ............. G06F 9/45558; G06F 9/452; G06F 2009/4557; G06F 2009/45595; H04L 63/0272
See application file for complete search history.

(56) References Cited

U.S. PATENT DOCUMENTS

| | | | |
|---|---|---|---|
| 9,680,764 B2 | 6/2017 | Prakash et al. | |
| 9,830,449 B1 | 11/2017 | Wagner | |
| 2014/0075494 A1* | 3/2014 | Fadida | G06F 9/45558 726/1 |
| 2014/0165063 A1* | 6/2014 | Shiva | G06F 9/45533 718/1 |
| 2017/0083354 A1* | 3/2017 | Thomas | G06F 9/5027 |
| 2017/0250870 A1* | 8/2017 | Zhao | H04L 63/20 |
| 2018/0324203 A1* | 11/2018 | Estes | G06F 9/5061 |

FOREIGN PATENT DOCUMENTS

CN          103902885 A          7/2014

OTHER PUBLICATIONS

International Search Report and Written Opinion for Application No. PCT/US2020/051994 dated Dec. 9, 2020, 14 pages.

* cited by examiner

*Primary Examiner* — Jacob D Dascomb
(74) *Attorney, Agent, or Firm* — Finch & Maloney PLLC

(57) ABSTRACT

A computer system is provided. The computer system includes a memory, a network interface, and at least one processor coupled to the memory and the network interface. The processor is configured to receive, via the network interface, a request for a computing session; determine a security score for the computing session; identify a virtual resource designated to support computing sessions having the security score; and establish the computing session with the virtual resource.

20 Claims, 6 Drawing Sheets

SECURITY RISK LOAD BALANCING SYSTEMS AND METHODS

BACKGROUND

Traditional load balancing solutions focus on distributing load evenly across a static pool of available resources. However, with the advent of cloud computing environments, where a pool of available resources is dynamic, load balancing solutions with a broadened focus on both operational and cost efficiency have emerged. These new load balancing solutions distribute load evenly across an available pool and only add resources where required to maintain a target level of service because adding resources in a cloud computing environment is costly. Thus, the new load balancing solutions can minimize, for example, the number of virtual machines (VMs) running at a given point in time to save money.

SUMMARY

In at least one example, a computer system is provided. The computer system includes a memory, a network interface, and at least one processor coupled to the memory and the network interface. The at least one processor is configured to receive, via the network interface, a request for a computing session; determine a security score for the computing session; identify a virtual resource designated to support computing sessions having the security score; and establish the computing session with the virtual resource.

At least some examples of the computer system can include one or more of the following features. In the computer system, the request for the computing session can include a request for either a virtual desktop or a virtual application. The computer system can further include a computing device hosting a client application configured to provide access to one or more of the virtual desktop or the virtual application. In the computer system, to establish the computing session can include to establish a computing session involving the computing device, the client application, and the virtual resource.

In the computer system, to determine a security score can include to determine a security score for a user of the computing session. In the computer system, to identify the virtual resource can include to access a data structure that associates virtual resources with one or more reference values that indicate security scores of computing sessions that the virtual resources are designated to support. The one or more reference values can include a plurality of security scores including the security score. The request can be a first request, the computing session can be a first computing session, and the security score can be a first security score. The at least one processor can be further configured to receive, via the network interface, a second request for a second computing session; determine a second security score for the second computing session; determine that the plurality of security scores includes the second security score; identify the virtual resource as being designated to support computing sessions having the second security score in response to determining that the plurality of security scores includes the second security score; and establish the second computing session with the virtual resource.

In the computer system, the at least one processor can be further configured to identify, using a set of operational metrics, a plurality of virtual resources capable of supporting the computing session, each virtual resource of the plurality of virtual resources having an average security score. In the computer system, to identify the virtual resource can include to identify the virtual resource as having an average security score closer to the security score of the computing session than the average security score of another virtual resource of the plurality of virtual resources.

In another example, a method of load balancing security risk of computing sessions using a computer system is provided. The method includes acts of receiving a request for a computing session; determining a security score for the computing session; identifying a virtual resource designated to support computing sessions having the security score; and establishing the computing session with the virtual resource. In the method, the act of receiving the request can include an act of receiving a request for either a virtual desktop or a virtual application. The act of establishing the computing session can include an act of establishing a computing session involving computing device hosting a client application, the client application, and the virtual resource. The act of determining a security score can include an act of determining a security score for a user of the computing session. The act of identifying the virtual resource can include an act of accessing a data structure that associates virtual resources with one or more reference values that indicate security scores of computing sessions that the virtual resources are designated to support.

In the method, the request can be a first request, the computing session can be a first computing session, the security score can be a first security score, and the one or more reference values can include a plurality of security scores. The method can further include acts of receiving a second request for a second computing session; determining a second security score for the second computing session; determining that the plurality of security scores includes the second security score; identifying the virtual resource as being designated to support computing sessions having the second security score in response to determining that the plurality of security scores includes the second security score; and establishing the second computing session with the virtual resource.

The method can further include an act of identifying, using a set of operational metrics, a plurality of virtual resources capable of supporting the computing session, each virtual resource of the plurality of virtual resources having an average security score. In the method, the act of identifying the virtual resource can include an act of identifying the virtual resource as having an average security score closer to the security score of the computing session than the average security score of another virtual resource of the plurality of virtual resources.

In another example, a non-transitory computer readable medium is provided. The computer readable medium stores processor executable instructions to load balance security risk of computing sessions. The instructions include instructions to receive a request for a computing session; determine a security score for the computing session; identify a virtual resource designated to support computing sessions having the security score; and establish the computing session with the virtual resource.

At least some examples of the computer readable medium can include one or more of the following features. In the computer readable medium, the instructions to receive the request can include instructions to receive a request for either a virtual desktop or a virtual application. The instructions to establish the computing session can include instructions to establish a computing session involving computing device hosting a client application, the client application, and the virtual resource. The instructions to determine a security score can include instructions to determine a security score for a user of the computing session. The instructions to identify the virtual resource can include instructions to access a data structure that associates virtual resources with one or more reference values that indicate security scores of computing sessions that the virtual resources are designated to support.

In the computer readable medium, the request can be a first request, the computing session can be a first computing session, the security score can be a first security score, and the one or more reference values can include a plurality of security scores. The instructions can further include instructions to receive a second request for a second computing session; determine a second security score for the second computing session; determine that the plurality of security scores includes the second security score; identify the virtual resource as being designated to support computing sessions having the second security score in response to determining that the plurality of security scores includes the second security score; and establish the second computing session with the virtual resource.

The computer readable medium can further include instructions to identify, using a set of operational metrics, a plurality of virtual resources capable of supporting the computing session, each virtual resource of the plurality of virtual resources having an average security score. The instructions to identify the virtual resource can include instructions to identify the virtual resource as having an average security score closer to the security score of the computing session than the average security score of another virtual resource of the plurality of virtual resources.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
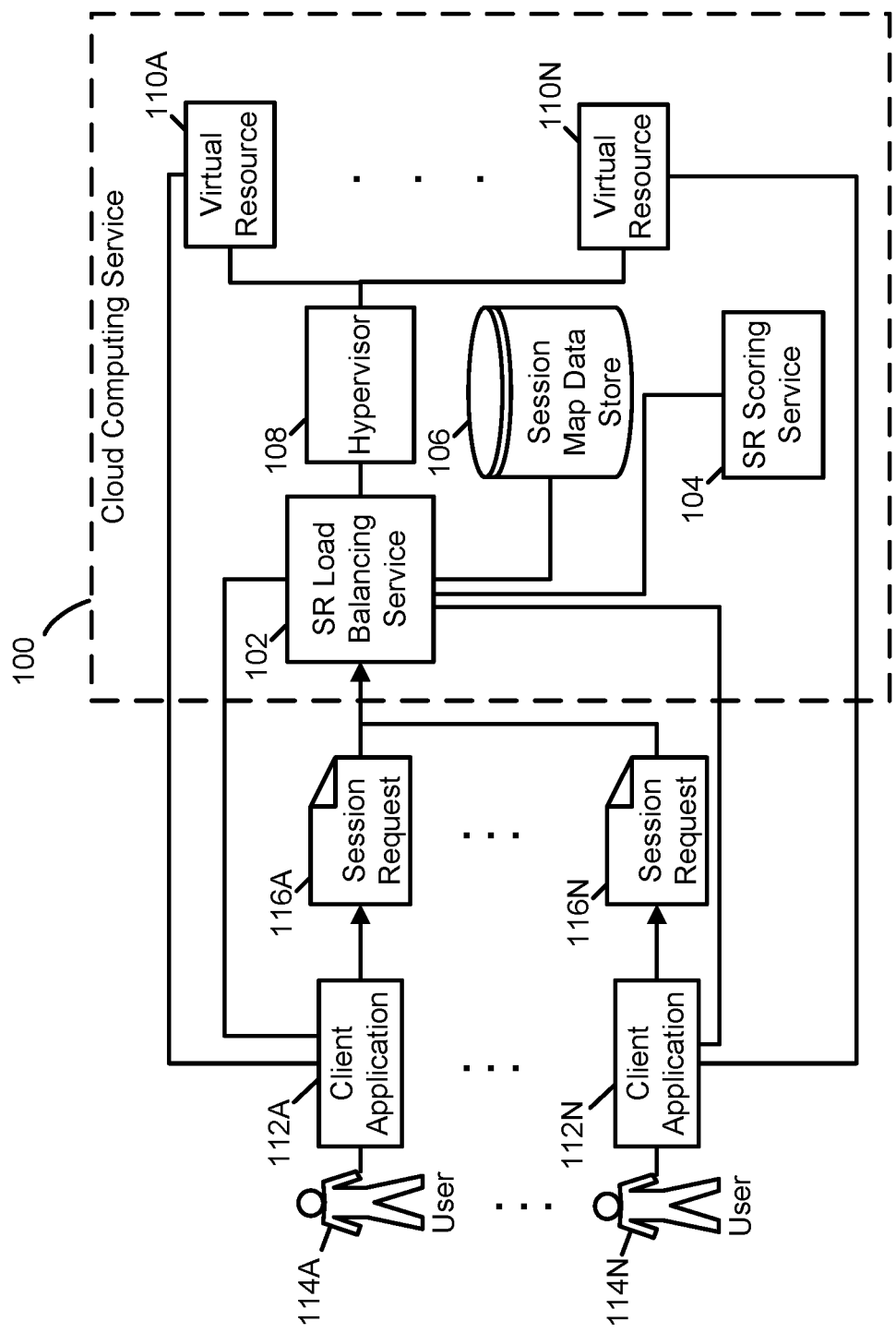
FIG. 1 is a block diagram of a cloud computing service including a security risk (SR) load balancing service in accordance with an example of the present disclosure.

As summarized above, various examples described herein are directed to systems and methods that balance computing session loads across available resources to reduce security risk. These systems and methods overcome technical difficulties that arise when computing sessions with varying security risk profiles share common resources, such as a common virtual machine, virtual application, or other execution environment. Despite the sundry security measures present in modern computing environments, sharing a common resource with other computing sessions can increase the risk of being subject to an attack. This risk is heightened when sharing the common resource with computing sessions involving, for example, non-standard or compromised computing devices, software applications, and/or users.

To address this security risk and other issues, SR load balancing systems and processes are provided. These systems and processes enable a cloud computing environment to assign computing sessions with similar security scores to a common set of resources. The computing sessions can vary in programmatic scope. As such, computing sessions can be limited to execution of a single instruction or can include fully user-interactive exchanges involving a computing device associated with a user and virtual resources included within the cloud computing environment.

In some examples, an SR load balancing service processes requests for computing sessions received from devices associated with various users. In processing each request for a computing session, the SR load balancing service can determine a security score for the computing session and can identify a set of resources to support the requested computing session based at least in part on the determined security score. For instance, in at least some examples, the SR load balancing service maintains a map with records that associate resources with reference values that indicate security scores of computing sessions that the resources are designated to support. These reference values can include a range of security scores, a set of security scores, and/or one or more metrics based on security scores (e.g., a mean, mode, median of security scores of computing sessions involving the resource). In these examples, to identify one or more resources for the requested computing session, the SR load balancing service first identifies, using the map, one or more records with at least one reference value that has a predefined relationship to the security score of the requested computing session. For instance, in one example where the reference value is an average security score of the resource, the SR load balancing service first identifies one or more map records with an average security score closest to the security score of the requested computing session. In this example, the SR load balancing service determines the average security score of a resource by averaging the security scores of the computing sessions supported by the resource. In another example where the reference value is a range of security scores, the SR load balancing service first identifies one or more map records with a range of security scores that includes the security score of the requested computing session. In another example where the reference value is a set of security scores, the SR load balancing service first identifies one or more map records with a set of security scores that includes the security score of the requested computing session. Other reference values and relationships will be apparent in view of this disclosure.

Next, the SR load balancing service retrieves identifiers of the one or more resources stored in the identified map records. With the one or more resources identified, the SR load balancing service can establish the requested computing session using the one or more identified resources. In this way, the SR load balancing service groups computing sessions having similar security scores together and avoids having a low security risk session and a high security risk session sharing the same resource.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

SR Load Balancing Service

In some examples, a cloud computing service is configured to implement an SR load balancing service to assign computing sessions with similar security scores to common sets of resources. FIG. 1 illustrates a logical architecture of a cloud computing service 100 in accordance with these examples. As shown, the service 100 includes an SR load balancing service 102, an SR scoring service 104, a session map data store 106, a hypervisor 108, and virtual resources 110A-110N. FIG. 1 also depicts client applications 112A-112N that are associated (e.g., via authenticated user credentials) with users 114A-114N and that interoperate with the service 100 by exchanging messages including session requests 116A-116N. For ease of reference, each of the resources 110A-110N, the clients 112A-112N, the users 114A-114N, and the requests 116A-116N may be referred to collectively as the resources 110, the clients 112, the users 114, and the requests 116. Individual members of these collectives may be referred to generically as the resource 110, the client 112, the user 114, and the request 116.

In some examples, the balancing service 102 processes the requests 116 by interoperating with the SR scoring service 104, the data store 106, the hypervisor 108, and the client 112. More specifically, in these examples, the balancing service receives each request 116 and executes a multistep process for each request 116. Within this process, for each request 116, the balancing service determines a security score of a computing session specified in the request. For instance, in some examples, the security score can be between 0 and 100 with higher scores indicating higher risk. With this security score in hand, the balancing service interoperates with the data store 106 to identify pre-existing resources 110 that can support the computing session in view its security score. The balancing service stores associations between the identified pre-existing resources 110 and the computing session by storing an association between the request and the pre-existing resources 110 within map records for the pre-existing resources 110 in the data store 106.

Where the balancing service is unable to identify a complete set of pre-existing resources 110 that can support the computing session in view its security score, the balancing service expands the number of pre-existing resources that can support the computing session by either spawning new resources 110 or, if resource constrained, relaxing the search criteria used to identify pre-existing resources 110 that can support the computing session. For example, where spawning new resources 110, the balancing service interoperates with the hypervisor 108 to spawn resources 110 of one or more types that the balancing service was unable to identify. The hypervisor 108 can include any of a variety of commercially available hypervisors, such as a Citrix® hypervisor. Alternatively or additionally, where relaxing the search criteria, the balancing service, for example, shifts from searching for a range of reference values that includes the security score of the requested computing session to searching for a reference value that is closest to the security score of the requested computing session. Once the balancing service spawns and/or identifies sufficient resources 110 to complete the set, the balancing service establishes the requested computing session by interoperating with the client 112. These and other example implementations are described in detail below.

As shown in FIG. 1, the service 100 is configured to receive the requests 116 and to provide the requests 116 to the balancing service 102 for processing. The requests 116 can include a variety of information required by the service 100 to establish distributed computing sessions involving the clients 112 and the resources 110. This request information can include identifiers of users 114 who originate the requests 116, identifiers of the clients 112 transmitting the requests 116, identifiers client computing devices hosting the clients 112, and identifiers of types of resources 110 (e.g., virtual machines, virtual applications, etc.) requested for the computing sessions, among other information.

In some examples, to process the requests 116, the balancing service 102 is configured to execute a sequence of operations for each of the requests 116. The sequence of operations for each request 116 can include receiving and parsing the request 116, determining a security score for the requested computing session, and associating a set of virtual resources 110 with the request 116 based on the security score. The sequence of operations can further include establishing the requested computing session between the set of virtual resources 110 and the client 112 that transmitted the request 116. It should be noted that a given set of the virtual resources 110 can include any number of resources. For example, a first set of virtual resources can include a virtual machine, a second set of virtual resources can include a virtual application, and a third set of virtual resources can include a two or more of virtual machines. Thus, the examples disclosed herein are not limited to a particular set of virtual resources 110.

In some examples, to determine a security score for the request 116, the balancing service 102 is configured to interoperate with the scoring service 104. In these examples, the balancing service 102 is configured to generate and transmit a scoring request to the scoring service 104 and to receive and process a response thereto. The scoring request can include, for example, an identifier of a user 114 who originated the request 116, an identifier of the client 112 that transmitted the request 116, an identifier of a client computing device that hosts the client 112, and one or more identifiers of types of resources requested for the computing session. The types of resources that can be identified in a scoring request can include virtual machines, specific virtual applications, or other virtual components. The response to the scoring request received and processed by the balancing service 102 can include a security score generated by the scoring service 104 based on the scoring request.

In some examples, to associate the set of identified virtual resources 110 with the request 116, the balancing service 102 is configured to interoperate with the data store 106. In these examples, the balancing service 102 is configured to generate and transmit mapping queries, association queries, and/or provisioning queries to the data store 106 and to receive and process responses thereto. In some examples, mapping queries can identify instantiated resources 110 that are designated to support computing sessions having particular security scores. The association queries can associate particular requests 116 with identified, instantiated resources 110. The provisioning queries can add new map data records for newly instantiated resources 110. Each of these query types is described further below.

In some examples, a mapping query can include, for example, a security score of a requested computing session and one or more identifiers of the types of resources specified in the request 116. The response to the mapping query can include one or more identifiers of one or more instantiated resources 110 of the requested type that are designated to support computing sessions having the security score provided in the mapping query. The response to the mapping query can further include a number of requests 116 that are currently associated with each of the one or more identified instantiated resources 110. Where no resources of the requested type and designation exist, the response to the mapping query can include a negative acknowledgement.

In some examples, in transmitting a mapping query, the balancing service 102 is configured to search the map data for records that include a resource type identifier that matches the type identifier in the mapping query and that include one or more reference values that are in a predefined relationship with the security score specified in the mapping query. For instance, in one example where reference values include a range of security scores, the SR load balancing service searches for map records with a range of security scores that includes the security score specified in the mapping query. In another example where reference values include a set of security scores, the SR load balancing service searches for one or more map records with a set of security scores that includes the security score specified in the mapping query. In another example where the reference values include an average security score of the resource, the SR load balancing service searches for one or more map records with an average security score closest to the security score specified in the mapping query. It should be noted that, in some examples, the balancing service 102 is configured to generate mapping queries that search using any of the above specified search/matching techniques in addition to other techniques that will be apparent in view of this disclosure.

In some examples, to handle a response to the mapping query that returns identifiers of two or more instantiated resources 110, the balancing service 102 is configured to designate an instantiated resource 110 to associate with the request 116 using one or more additional criteria. The additional criteria can vary between examples. For instance, in one example, the additional criteria focus on operational efficiency, and the balancing service 102 is configured to identify the least utilized of the two or more identified instantiated resources 110 and to associate the least utilized resource 110 with the request 116. For instance, in some examples, the balancing service 102 can identify the least utilized resource 110 as the resource 110 that has fewest requests 116 currently associated with it according to the data provided in the response.

In some examples, the balancing service 102 is configured to associate a designated resource with the request 116 by generating and transmitting an association query to the data store 106 and receiving and processing responses thereto. In these examples, the designated resource can be, for example, the only resource 110 returned in the response to the mapping query or a resource 110 selected via additional criteria. The association query can include, for example, an identifier of the request 116 and an identifier of the designated resource 110. The response to the association query can include an acknowledgement or a negative acknowledgement indicating whether the data store 106 successfully updated the map data record associated with the least utilized resource 110 to store the identifier of the request 116.

In some examples, to handle a response to a mapping query that includes a negative acknowledgement, the balancing service 102 is configured to either spawn a resource or generate and transmit a second mapping query with relaxed search criteria and to receive and process a response thereto. This relaxed search criteria can, for example, cause the data store 106 to identify a map record having a reference value that is closest to the security score of the requested computing session, thus ensuring at least one identified instantiated resource 110 will be returned by the mapping query, should any instantiated resource 110 exist. The reference value can, as explained above, be an average security score of computing session supported by the resource 110 that is identified in the map record.

In certain examples, to handle spawning of a resource, the balancing service 102 is configured to instantiate a resource 110 of the requested type, generate and transmit a provisioning query to record the instantiated resource 110 in the data store 106, and receive and process a response thereto. In these examples, to instantiate the resource of the requested type, the balancing service 102 is configured to interoperate with the hypervisor 108. For instance, the balancing service 102 can be configured to generate and transmit an instantiation request for the requested resource type to the hypervisor 108 and to receive and process a response thereto. The instantiation request can include, for example, an identifier of a type of resource to be instantiated. The response to the instantiation request can include an identifier of an instantiated resource 110 or a negative acknowledgement indicating that the hypervisor 108 failed to instantiate a resource 110 of the requested type.

Further, in these examples, the provisioning query can include, for example, an identifier of an instantiated resource 110, an identifier of a type of which the resource 110 is an instance, one or more reference values that indicate security scores of computing sessions that the instantiated resource is designated to support, and an identifier of the request 116. The response to each provisioning query received and processed by the balancing service 102 can include an acknowledgement or a negative acknowledgement indicating whether the data store 106 successfully added, for the instantiated resource 110, a record of map data including the identifier of the instantiated resource 110, the identifier of the resource type, the one or more reference values, and the identifier of the request 116. It should be noted that provisioned resources can, in some examples, be re-provisioned as needed to adjust values in the map record (e.g., reference values).

In some examples, to establish a computing session for the request 116, the balancing service 102 is configured to interoperate with the client 112 that transmitted the request 116. In these examples, the balancing service 102 is configured to generate and transmit an assignment request to the client 112 and to receive and process a response thereto. The assignment request can include, for example, the one or more identifiers of a set of resources 110 mapped to the request 116 to support the computing session requested by the client 112. The response to the assignment request received and processed by the balancing service 102 can include an acknowledgement or a negative acknowledgement indicating whether the client 112 successfully accessed the set of resources identified to support the computing session.

Examples of the balancing service 102 are not limited to the configurations described above. Refinements to these configurations and further examples of processes that the balancing service 102 can be configured to execute are described further below with reference to FIG. 2.

In some examples, the scoring service 104 is configured to execute a sequence of operations to process scoring requests received from the balancing service 102. The sequence of operations for each scoring request can include parsing the scoring request and determining a security score for a session request 116 based on the data included in the scoring request. The sequence of operations can also include generating a response to the scoring request that includes the security score and transmitting the response to the balancing service 102.

The scoring service 104 can be configured to implement one or more of a variety of scoring processes to generate a security score responsive to reception of a scoring request. These scoring processes can, for example, receive one or more of the identifiers included in the scoring request as input and generate a security score based on historical information descriptive of the one or more entities identified by the identifiers. For instance, in some examples, the scoring service 104 is configured to generate a security score using UEBA. Such a security score indicates an extent to which an entity's behavior, activity, state, and/or action deviates from established, historical baselines. At least one example of an UEBA-based scoring process that the scoring service 104 can be configured to execute is described further below with reference to FIG. 2. In at least one example, the scoring service 104 is implemented as a Citrix® Security Analytics installation.

In some examples, the data store 106 includes data structures configured to store map data. The map data can include, for example, a record for each resource 110. Each of these map data records can include, and thereby associate, fields configured to store an identifier of the resource 110, an identifier of the type of which the resource 110 is an instance, one or more reference values (e.g., a set, range, and/or average of security scores) that indicate on security scores that the resource 110 is designated to support, and identifiers of requests 116 that the resource 110 is currently supporting. The data store 106 can be implemented using a variety of data storage technology, such as relational and non-relational databases, operating system files, hierarchical databases, or the like.

In some examples, the data store 106 is configured to receive, process, and respond to mapping, association, and provisioning queries received from the balancing service 102. In these examples, to process each mapping query, the data store 106 is configured to execute a sequence of operations. The sequence of operations includes parsing the query and searching map data for one or more matching records storing values that match the security score and resource type identifier specified in the mapping query. As explained above, a variety of matching techniques and criteria can be used. The sequence of operations also includes generating and transmitting a response to the balancing service 102. To handle situations where one or more matching records are found, the sequence of operations includes storing identifiers of resources 110 from in the matching records in the response. To handle situations where no matching records are found, the sequence of operations includes storing a negative acknowledgment in the response.

In certain examples, to process each association query, the data store 106 is configured to execute a sequence of operations. The sequence of operations includes parsing the query and searching map data for a record storing a value that matches the identifier of a resource 110 specified in the query. The sequence of operations also includes modifying a matching record by inserting an identifier of the request 116 specified in the query into the matching record. This insertion creates an association between the request 116 and the resource 110 identified in the record and indicates that the resource 110 is currently associated with request 116 and supporting the computing session specified in the request 116. The sequence of operations additionally includes updating the reference values stored in the matching record to factor in the security score of the requested computing session. For instance, updating the reference values can include adding the security score of the requested computing session to a set or range of security scores stored as reference values and/or re-calculating an average security score for the resource 110 specified in the query by averaging the security scores of the computing sessions assigned to the resource 110. The sequence of operations further includes generating a response and transmitting the response to the balancing service 102. To handle situations where a matching record was found and successfully modified, the sequence of instructions includes storing an acknowledgment in the response. To handle situations where a matching record was not found or the query failed for another reason, the sequence of instructions includes storing a negative acknowledgment in the response.

In certain examples, to process each provisioning query, the data store 106 is configured to execute a sequence of operations. The sequence of operations includes parsing the query and inserting or updating a record of map data with values specified in the query. These values can include the identifier of the resource 110, the type of the resource 110, the reference values that indicate security scores of computing sessions that the resource 110 is designated to support, and the identifier of the request 116. The sequence of operations also includes generating a response including an acknowledgment or a negative acknowledgement to indicate whether the provisioning query was successfully processed and transmitting the response to the balancing service 102.

The clients 112 are configured to interoperate with the service 100 to execute computing sessions for the users 114. More specially, in some examples, the clients 112 are configured to transmit requests 116 to the service 100. The clients 112 can include a variety of programs, such as browsers, specialized clients that provide access to virtual desktops or virtual applications (e.g., as the Citrix® Workspace App), and the like. As such, the clients 112 can be configured to generate the session requests 116 to include various information, such as identifiers of users originating the requests, identifiers of the client applications transmitting the requests, identifiers of client computing devices hosting the client applications, and identifiers of virtual resources requested for the computing sessions. Further, in these examples, the responses to the session requests can includes identifiers (e.g., a transmission control protocol/internet protocol address, etc.) of the virtual resources 110 assigned to support and associated with the requested computing session.

To support computing sessions established with the cloud computing service, the client applications 112 can be configured to interoperate with the resources 110 by transmitting input acquired from the users 114, or messages based on the input, to the resources 110. The resources 110 can include virtual machines, virtual applications, and other virtual resources. The resources 110 can be configured to process the input and the messages and to transmit output or response messages resulting from the processing back to the clients 112. Each of the clients 112, in turn, is configured to again interoperate with the resources 110 by receiving the output and response messages and rendering, to the user 114, the output received or other output based on the response messages. In this way, the clients 112 provide, to the users 114, computing sessions that leverage the resources 110.

SR Load Balancing Processes

Figure 2:
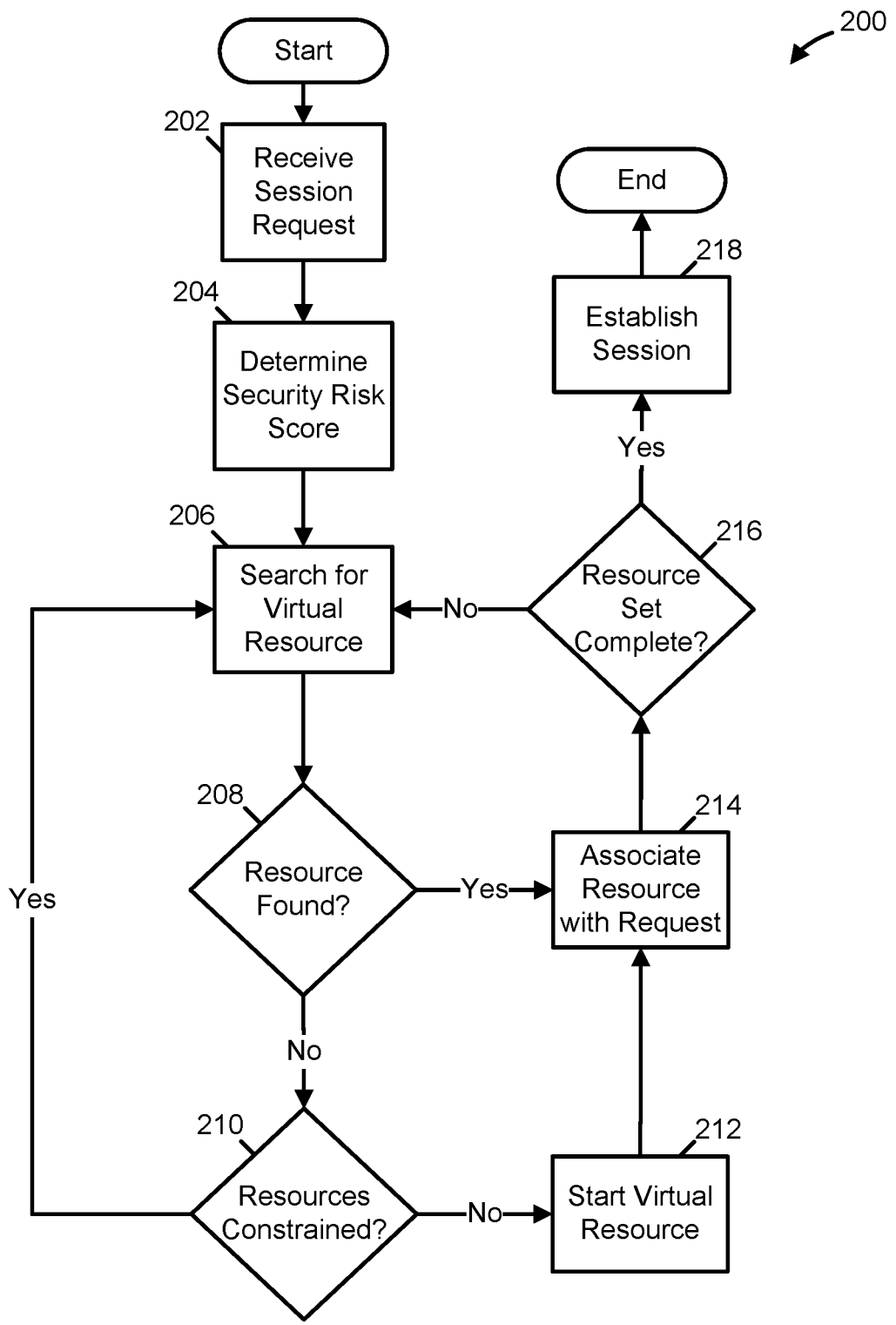
FIG. 2 is a flow diagram of a SR load balancing process in accordance with an example of the present disclosure.

As described above, some examples of the balancing service 102 of FIG. 1 are configured to execute processes that distribute computing sessions with similar security scores to common resources. FIG. 2 illustrates an example of SR load balancing process 200 executed by the balancing service 102 in some examples.

The process 200 starts with a balancing service (e.g., the balancing service 102 of FIG. 1) hosted by a computing device (e.g., a computing platform as described below with reference to FIG. 6) receiving 202 a session request (e.g., one of the requests 116). The balancing service parses the request and identifies a user (e.g., one of the users 114 of FIG. 1) who originated the session request, a client application (e.g., one of the clients 112 of FIG. 1) that transmitted the session request, the computing device hosting the client application, and/or one or more types of virtual resource requested to be part of the set of virtual resources (e.g. the resources 110) to be assigned the computing session.

Using the request information parsed from the session request, the balancing service determines 204 a security score for the computing session specified in the session request. In some examples, to determine 204 the security score, the balancing service generates and transmits a scoring request to a scoring service (e.g., the scoring service 104 of FIG. 1) and receives and processes a response thereto that specifies the security score. In these examples, the scoring service receives and processes the scoring request and generates and transmits the response specifying the security score.

In at least one example, the scoring service executes a user and entity behavior analytics (UEBA) based scoring process to generate a security score. In this example, prior to the receipt of any scoring request, the scoring service monitors the activity of the users 114, clients 112, computing devices that host the clients 112, and resources 110 of FIG. 1 to track the occurrence of particular events within the computing sessions involving these entities. These events can include, for example, network logins, file downloads, network locations accessed, programs executed, and the like. Over time, the scoring service builds a baseline for the monitored entities that reflects their normal on-line behavior and, further maintains a security score for each entity and/or combination of entities that reflects deviations from their baselines. In these examples, to generate the security score specified in the response to a given scoring request, the scoring service retrieves the security score for one or more of the entities specified in the scoring request.

Continuing the process 200, the balancing service searches 206 for an instantiated virtual resource that is of the next requested type and that is designated to support computing sessions with the determined security score. For instance, in some examples, the balancing service transmits one or more mapping queries to a session map data store (e.g. the data store 106 of FIG. 1). Next, the balancing service determines 208 whether one or more instantiated virtual resources were identified by the search. For instance, in some examples, the balancing service receives responses to the mapping queries and processes the responses to determine whether each identifies any instantiated virtual resources.

Where the balancing service determines 208 that no instantiated virtual resources were identified that are of a requested type and that support computing sessions with the determined security score, the balancing service determines 210 whether it is configured to operate using constrained resources. For example, the balancing service can access a configurable parameter in memory to determine its operational mode. If the balancing service determines 210 that it is not configured to operate using constrained resources, the balancing service starts 212 a virtual resource of the requested type. For instance, in some examples, the balancing service transmits an instantiation request to a hypervisor (e.g. the hypervisor 108 of FIG. 1) to start 212 the virtual resource and transmits a provisioning query to the session map to record the existence of the virtual resource and to associate 214 the virtual resource with the request.

Where the balancing service determines 210 that it is configured to operate using constrained resources, the balancing service returns to search 206, with relaxed search criteria, for an instantiated virtual resource that is of the requested type. For instance, in some examples, the balancing service transmits one or more mapping queries with the relaxed search criteria to the session map. This relaxed search criteria can, for example, cause the data store to identify a map record having a reference value that is closest to the security score of the requested computing session, thus ensuring at least one identified instantiated resource will be returned by the mapping query, should any instantiated resources exist. The reference value can, as explained above, be an average security score of computing session supported by the resource that is identified in the map record.

Where the balancing service determines 208 that plural instantiated virtual resources were identified that are of a requested type and that support computing sessions with the determined security score, the balancing service identifies one of the plural virtual resources that meets one or more additional criteria. For instance, in some examples, the balancing service identifies a least utilized resource as meeting the additional criteria. In these examples, the balancing service identifies the least utilized resource as the resource that has fewest requests currently associated with it according to the data provided in the response to the mapping query. Upon identifying the resource that meets the additional criteria, the balancing service associates 214 that resource with the session request by, for example, transmitting an association query to the data store.

Where the balancing service determines 208 that only one instantiated virtual resource was identified that is of a requested type and that supports computing sessions with the determined security score, the balancing service associates 214 the identified resource with the session request by, for example, transmitting an association query to the data store.

Continuing the process 200, the balancing service determines 216 whether the set of virtual recourse is complete (e.g., all of the types of requested virtual resources have been associated with the session request). Where the set of virtual resources is not complete, the balancing process searches 206 for the next type of virtual resource of the set. Where the set of virtual resources is complete, the balancing service establishes 218 the requested computing session. For instance, in some examples, the balancing service transmits an assignment request to the client application. After establishing 218 the requested computing session, the process 200 ends.

Process in accordance with the process 200 enable the service 100 to decrease the risk of attack faced by low risk computing sessions by grouping computing sessions with similar security scores to common resources.

The process 200 as disclosed herein depicts one particular sequence of acts in a particular example. Some acts are optional and, as such, can be omitted in accord with one or more examples. Additionally, the order of acts can be altered, or other acts can be added, without departing from the scope of the apparatus and methods discussed herein.

Further Examples

Figure 3:
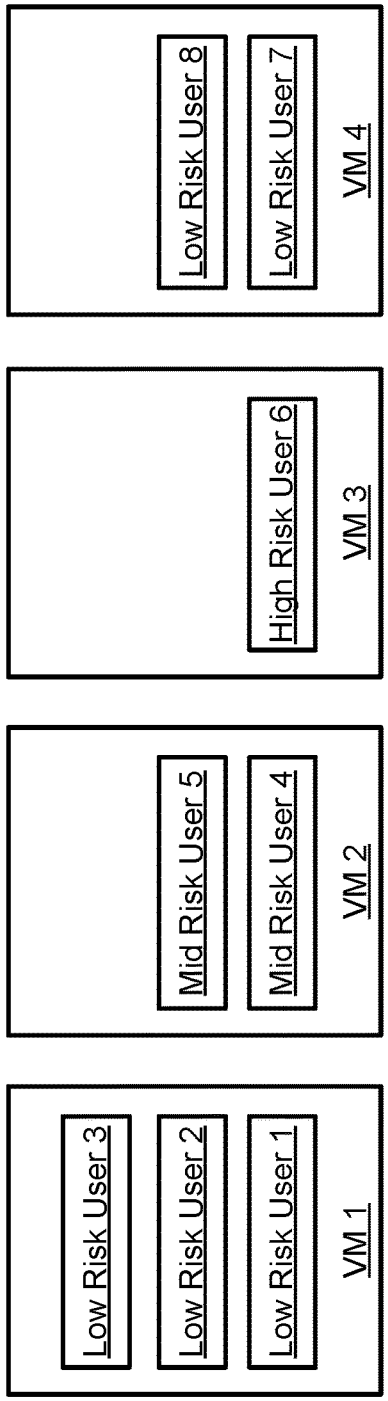
FIG. 3 is a block diagram of a set of virtual machines balanced by an SR load balancing service in accordance with an example of the present disclosure.
Figure 4:
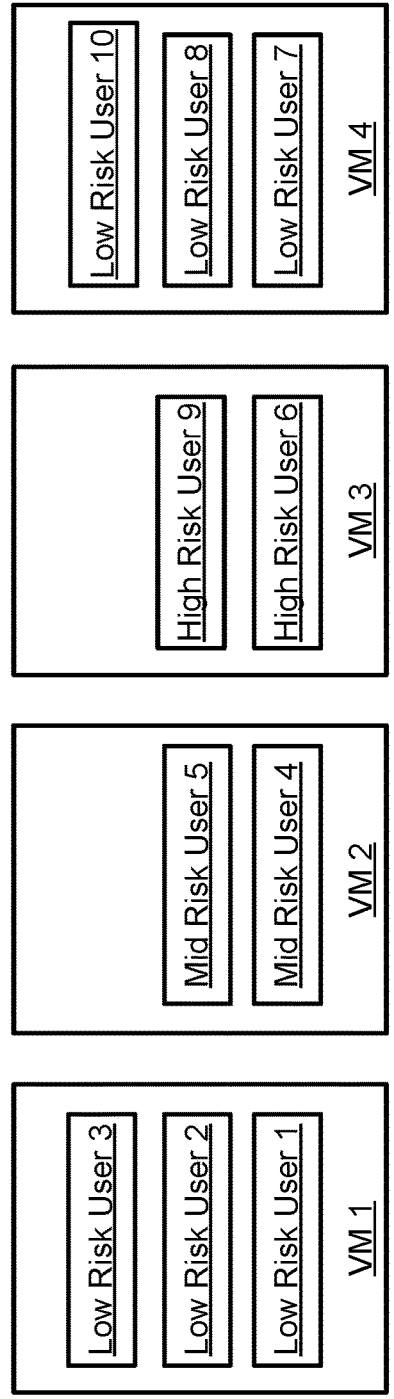
FIG. 4 is another block diagram of a set of virtual machines balanced by an SR load balancing service in accordance with an example of the present disclosure.

FIG. 3 illustrates an example set of virtual resources (e.g., the resources 110 of FIG. 1) load balanced by a balancing service (e.g., the balancing service 102). As shown in FIG. 3, the virtual resources are four virtual machines VM 1-VM 4. VM 1 supports three computing sessions involving low risk users 1-3. VM 2 supports two computing sessions involving mid risk users 4 and 5. VM 3 supports a single computing session involving high risk user 6. VM 4 supports two computing sessions involving low risk users 7 and 8.

In this example, the balancing service receives a session request (e.g., a request 116 of FIG. 1) from another user. In response to receiving the session request, the balancing service identifies the user who originated the session request as the user 9 and transmits a scoring request to a scoring service (e.g., the scoring service 104 of FIG. 1). The scoring service determines a security score for the computing session based at least in part of the identity of the user 9 as provided in the scoring request. The scoring service transmits a response to the balancing service including the scoring request.

Continuing this example, the balancing service receives the response to the scoring request and parses the response to retrieve the security score for the computing session, which indicates that the user 9 is a high risk user and, therefore, the computing session is a high risk computing session. Responsive to reception of the response to the scoring request, the balancing service prepares a mapping query and transmits the mapping query to a session map data store (e.g. the data store 106 of FIG. 1). In response to receiving the mapping query, the session map identifies VM3 as being designated to support high risk computing sessions and further identifies that VM3 is of the type of virtual resource requested in the session request. More specifically, in this example, the session map identifies a map data record that associates VM3 with high risk computing sessions and returns the query results to the balancing service. Next, the balancing service receives the mapping query results, parses the results, associates VM3 with the session request (e.g., via an association query) and assigns the computing session to VM3 (e.g., via an assignment request).

Continuing this example, the balancing service receives another session request from another user. In response to receiving this session request, the balancing service identifies the user who originated the session request as the user 10 and transmits a scoring request to the scoring service. The scoring service determines a security score for the computing session based at least in part of the identity of the user 10 as provided in the scoring request. The scoring service transmits a response to the balancing service including the scoring request.

Continuing this example, the balancing service receives the response to the scoring request and parses the response to retrieve the security score for the computing session, which indicates that the user 10 is a low risk user and, therefore, the computing session is a low risk computing session. Responsive to reception of the response to the scoring request, the balancing service uses a mapping query to identify both VM1 and VM4.

Continuing this example, responsive to identifying more than one VM capable of support the computing session, the balancing service identifies VM4 has the least utilized of VM1 and VM4, and executes the actions required to assign the computing session for low risk user 10 to VM4.

Figure 5:
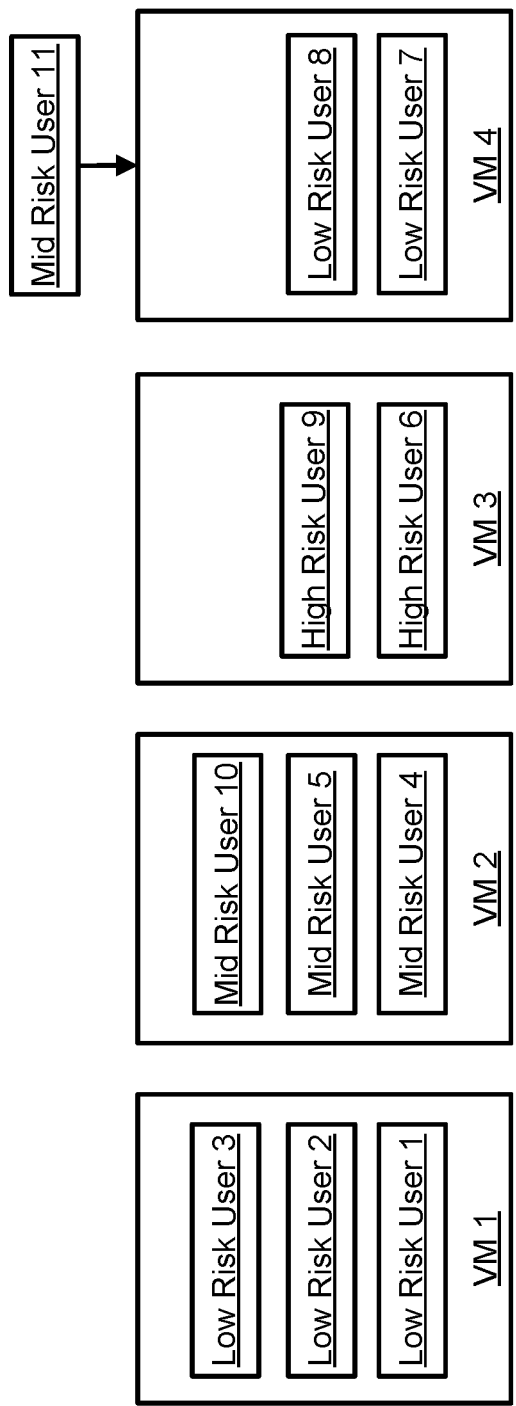
FIG. 5 is another block diagram of a set of virtual machines balanced by an SR load balancing service in accordance with an example of the present disclosure.

FIG. 5 illustrates another example in which the balancing service is resource constrained and configured to instantiate new virtual resources only for high risk computing sessions. As shown in FIG. 5, the virtual resources are four virtual machines VM 1-VM 4. VM 1 supports three computing sessions involving low risk users 1-3. VM 2 supports three computing sessions involving mid risk users 4, 5, and 10. VM 3 supports two computing sessions involving high risk users 6 and 9. VM 4 supports two computing sessions involving low risk users 7 and 8.

In this example, the balancing service receives another session request from another user. In response to receiving this session request, the balancing service identifies the user who originated the session request as the user 11 and transmits a scoring request to the scoring service. The scoring service determines a security score for the computing session based at least in part of the identity of the user 11 as provided in the scoring request. The scoring service transmits a response to the balancing service including the scoring request.

Continuing this example, the balancing service receives the response to the scoring request and parses the response to retrieve the security score for the computing session, which indicates that the user 11 is a mid risk user and, therefore, the computing session is a mid risk computing session. Responsive to reception of the response to the scoring request, the balancing service transmits a mapping query but receives a negative acknowledgement because VM2 is at capacity and, in this example, previously excluded by other operationally directed load balancing processes. So, in this example, the balancing service uses a mapping query with relaxed search criteria to identify VM1 and VM 4 as being designated to support low risk computing sessions. The balancing service further determines that VM4 is the least utilized and executes the actions required to assign the computing session for mid risk user 11 to VM4.

Computing Platform for SR Load Balancing Systems

Figure 6:
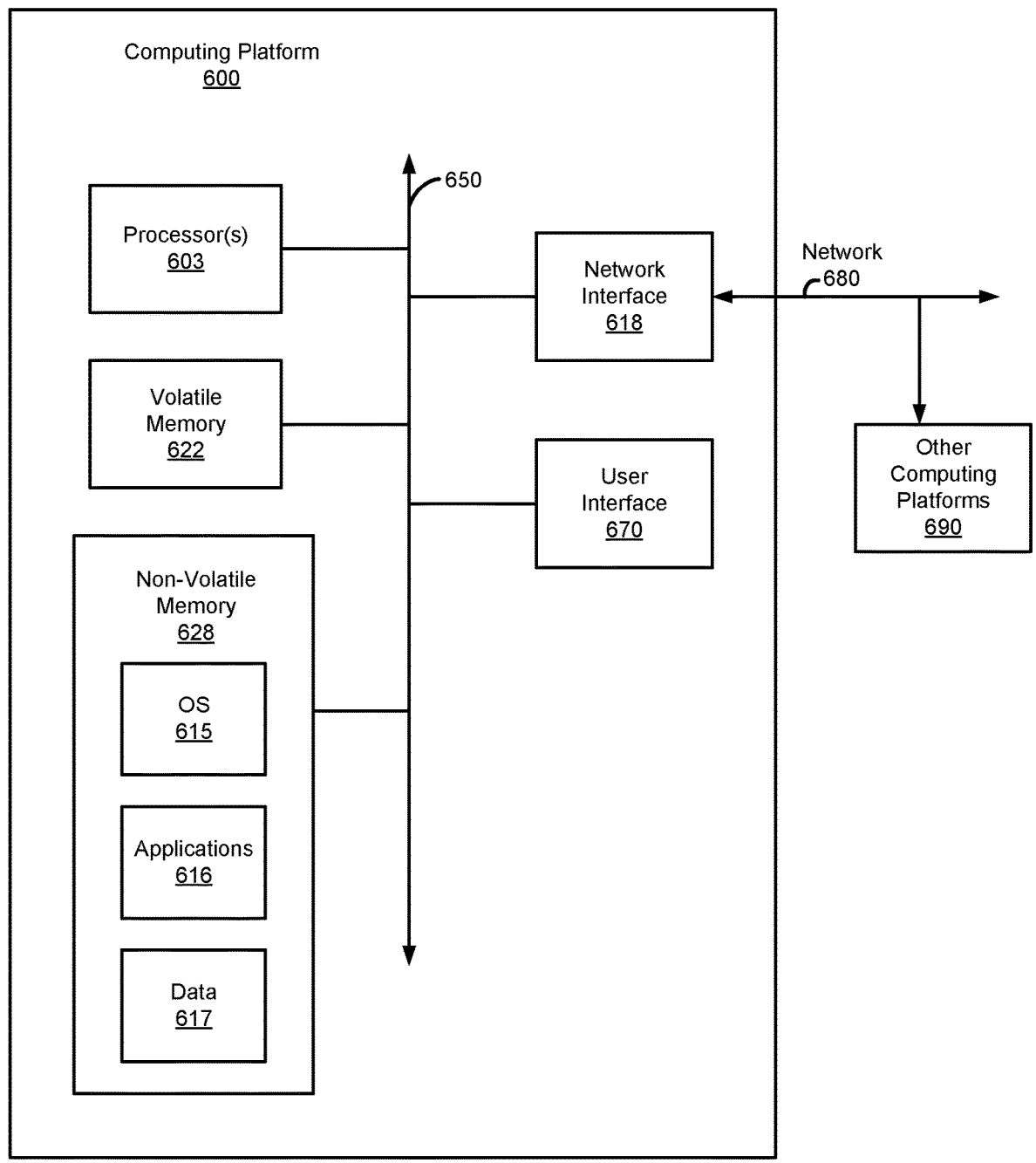
FIG. 6 is a block diagram of a network environment of computing devices in which various aspects of the present disclosure can be implemented.

FIG. 6 is a block diagram of a computing platform 600 configured to implement various SR load balancing systems and processes in accordance with examples disclosed herein.

The computing platform 600 includes one or more processor(s) 603, volatile memory 622 (e.g., random access memory (RAM)), non-volatile memory 628, a user interface (UI) 670, one or more network or communication interfaces 618, and a communications bus 650. The computing platform 600 may also be referred to as a client device, computing device, endpoint, computer, or a computer system.

The non-volatile (non-transitory) memory 628 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 670 can include a graphical user interface (GUI) (e.g., controls presented on a touchscreen, a display, etc.) and one or more input/output (I/O) devices (e.g., a mouse, a keyboard, a microphone, one or more speakers, one or more cameras, one or more biometric scanners, one or more environmental sensors, and one or more accelerometers, one or more visors, etc.).

The non-volatile memory 628 stores an operating system 615, one or more applications or programs 616, and data 617. The operating system 615 and the application 616 include sequences of instructions that are encoded for execution by processor(s) 603. Execution of these instructions results in manipulated data. Prior to their execution, the instructions can be copied to the volatile memory 622. In some examples, the volatile memory 622 can include one or more types of RAM and/or a cache memory that can offer a faster response time than a main memory. Data can be entered through the user interface 670 or received from the other I/O device(s), such as the network interface 618. The various elements of the platform 600 described above can communicate with one another via the communications bus 650.

The illustrated computing platform 600 is shown merely as an example client device or server and can be implemented within any computing or processing environment with any type of physical or virtual machine or set of physical and virtual machines that can have suitable hardware and/or software capable of operating as described herein.

The processor(s) 603 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor(s) 603 can be analog, digital or mixed. In some examples, the processor(s) 603 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The network interfaces 618 can include one or more interfaces to enable the computing platform 600 to access a computer network 680 such as a Local Area Network (LAN), a Wide Area Network (WAN), a Personal Area Network (PAN), or the Internet through a variety of wired and/or wireless connections, including cellular connections and Bluetooth connections. In some examples, the network 680 may allow for communication with other computing platforms 690, to enable distributed computing.

In described examples, the computing platform 600 can execute an application on behalf of a user of a client device. For example, the computing platform 600 can execute one or more virtual machines managed by a hypervisor. Each virtual machine can provide an execution session within which applications execute on behalf of a user or a client device, such as a hosted desktop session. The computing platform 600 can also execute a terminal services session to provide a hosted desktop environment. The computing platform 600 can provide access to a remote computing environment including one or more applications, one or more desktop applications, and one or more desktop sessions in which one or more applications can execute.

Figure 7:
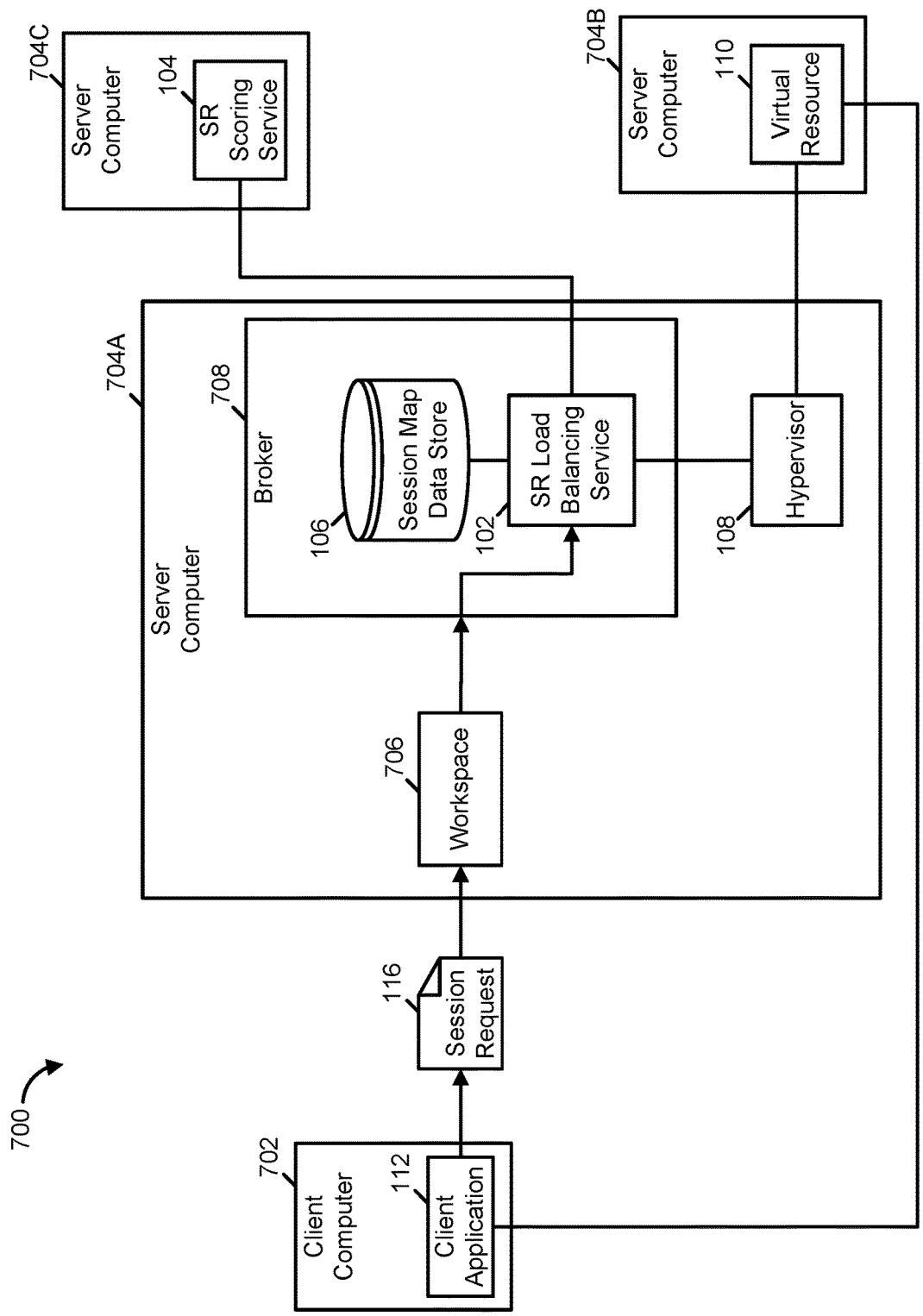
FIG. 7 is a block diagram of the cloud computing service of FIG. 1 as implemented by a configuration of computing devices in accordance with an example of the present disclosure.

FIG. 7 illustrates a cloud computing service (e.g., the service 100 of FIG. 1) configured for operation within a distributed computing platform (e.g. the computing platform 600 of FIG. 6). As shown in FIG. 7, the configuration 700 includes a client computer 702 and server computers 704A-704C. Within the configuration 700, the computer systems 702 and 704A-704C are communicatively coupled to one another and exchange data via a one or more networks.

As illustrated in FIG. 7, the client computer 702 is configured to host the client 112 (e.g., a Citrix® Workspace app) of FIG. 1. Examples of the client computer 702 include the computing platform 600 of FIG. 6. The server computer 704A is configured to host a workspace service 706 (e.g., a Citrix® Workspace service), a broker 708, and the hypervisor 108 of FIG. 1. The broker 708 includes the balancing service 102 and the session map data store 106 of FIG. 1. The server computer 704B is configured to host a virtual resource 110 of FIG. 1. The server computer 704C is configured to host the SR scoring service 104 of FIG. 1. Examples of the server computers 704A, 704B, and 704C include the computing platform 600 of FIG. 6. Many of the components illustrated in FIG. 7 are described above with reference to FIGS. 1 and 6. For purposes of brevity, those descriptions will not be repeated here, but each of these components is configured to function with reference to FIG. 7 as described with reference to its respective FIG. The description of these component may be augmented or refined below.

In the example of FIG. 7, the workspace service 706 receives the session request 116. The session request 116 includes a request for a virtual desktop or a virtual application. The workspace service 706 transmits the request to the broker 708 for the broker to determine which virtual resource is best suited for the requested computing session.

The broker 708 uses operational metrics such as CPU, memory, #users on each virtual resource, etc. to determine a pool of virtual resources available to participate in the requested computing session. In addition, the broker 708 interoperates with the balancing service 102 to identify the virtual resource with an average security score closest to the security score of the requested computing session and selects the identified virtual resource for participation in the requested computing session. For instance, the balancing service 102 can use mapping queries to identify the virtual resource.

The configuration 700 is but one example of many potential configurations that can be used to implement the service 100. As such, the examples disclosed herein are not limited to the particular configuration 700 and other configurations are considered to fall within the scope of this disclosure.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The invention claimed is:

1. A computer system comprising:
a memory;
a network interface; and
at least one processor coupled to the memory and the network interface and configured to
receive, via the network interface, a request for a computing session;
determine a security score for the computing session;
identify, using a set of operational metrics, a plurality of virtual resources capable of supporting the computing session, each virtual resource of the plurality of virtual resources having an average security score,
identify a virtual resource designated to support computing sessions having the security score, to identify the virtual resource comprising to identify the virtual resource as having an average security score closer to the security score of the computing session than the average security score of another virtual resource of the plurality of virtual resources; and
establish the computing session with the virtual resource.

2. The computer system of claim 1, wherein the request for the computing session comprises a request for either a virtual desktop or a virtual application.

3. The computer system of claim 2, further comprising a computing device hosting a client application configured to provide access to one or more of the virtual desktop or the virtual application.

4. The computer system of claim 3, wherein to establish the computing session comprises to establish a computing session involving the computing device, the client application, and the virtual resource.

5. The computer system of claim 1, where to determine a security score comprises to determine a security score for a user of the computing session.

6. The computer system of claim 1, wherein to identify the virtual resource comprises to access a data structure that associates virtual resources with one or more reference values that indicate security scores of computing sessions that the virtual resources are designated to support.

7. The computer system of claim 6, wherein the one or more reference values comprise a plurality of security scores including the security score.

8. The computer system of claim 7, wherein the request is a first request, the computing session is a first computing session, the security score is a first security score, and the at least one processor is further configured to:
receive, via the network interface, a second request for a second computing session;
determine a second security score for the second computing session;
determine that the plurality of security scores includes the second security score;
identify the virtual resource as being designated to support computing sessions having the second security score in response to determining that the plurality of security scores includes the second security score; and
establish the second computing session with the virtual resource.

9. A method of load balancing security risk of computing sessions using a computer system, the method comprising:
receiving a request for a computing session;
determining a security score for the computing session;
identifying, using a set of operational metrics, a plurality of virtual resources capable of supporting the computing session, each virtual resource of the plurality of virtual resources having an average security score;
identifying a virtual resource designated to support computing sessions having the security score, wherein identifying the virtual resource comprises identifying the virtual resource as having an average security score closer to the security score of the computing session than the average security score of another virtual resource of the plurality of virtual resources; and
establishing the computing session with the virtual resource.

10. The method of claim 9, wherein receiving the request comprises receiving a request for either a virtual desktop or a virtual application.

11. The method of claim 10, wherein establishing the computing session comprises establishing a computing session involving computing device hosting a client application, the client application, and the virtual resource.

12. The method of claim 9, where determining a security score comprises determining a security score for a user of the computing session.

13. The method of claim 9, wherein identifying the virtual resource comprises accessing a data structure that associates virtual resources with one or more reference values that indicate security scores of computing sessions that the virtual resources are designated to support.

14. The method of claim 13, wherein the request is a first request, the computing session is a first computing session, the security score is a first security score, the one or more reference values include a plurality of security scores, and the method further comprises:
- receiving a second request for a second computing session;
- determining a second security score for the second computing session;
- determining that the plurality of security scores includes the second security score;
- identifying the virtual resource as being designated to support computing sessions having the second security score in response to determining that the plurality of security scores includes the second security score; and
- establishing the second computing session with the virtual resource.

15. A non-transitory computer readable medium storing processor executable instructions to load balance security risk of computing sessions, the instructions comprising instructions to:
- receive a request for a computing session;
- determine a security score for the computing session;
- identify, using a set of operational metrics, a plurality of virtual resources capable of supporting the computing session, each virtual resource of the plurality of virtual resources having an average security score;
- identify a virtual resource designated to support computing sessions having the security score, to identify the virtual resource comprising to identify the virtual resource as having an average security score closer to the security score of the computing session than the average security score of another virtual resource of the plurality of virtual resources; and
- establish the computing session with the virtual resource.

16. The non-transitory computer readable medium of claim 15, wherein the instructions to receive the request comprise instructions to receive a request for either a virtual desktop or a virtual application.

17. The non-transitory computer readable medium of claim 16, wherein the instructions to establish the computing session comprise instructions to establish a computing session involving computing device hosting a client application, the client application, and the virtual resource.

18. The non-transitory computer readable medium of claim 15, where the instructions to determine a security score comprise instructions to determine a security score for a user of the computing session.

19. The non-transitory computer readable medium of claim 15, wherein the instructions to identify the virtual resource comprise instructions to access a data structure that associates virtual resources with one or more reference values that indicate security scores of computing sessions that the virtual resources are designated to support.

20. The non-transitory computer readable medium of claim 19, wherein the request is a first request, the computing session is a first computing session, the security score is a first security score, the one or more reference values include a plurality of security scores, and the instructions further comprise instructions to:
- receive a second request for a second computing session;
- determine a second security score for the second computing session;
- determine that the plurality of security scores includes the second security score;
- identify the virtual resource as being designated to support computing sessions having the second security score in response to determining that the plurality of security scores includes the second security score; and
- establish the second computing session with the virtual resource.

* * * * *